July 28, 1970  E. SCHMIDT  3,521,831

TAPE MEASURE WITH TAPE HOOK BUMPER SPRING

Filed Jan. 22, 1968

INVENTOR
ERWIN SCHMIDT
BY
*his attorneys.*
Learman, Learman & McCulloch

United States Patent Office 3,521,831
Patented July 28, 1970

---

3,521,831
TAPE MEASURE WITH TAPE HOOK BUMPER SPRING
Erwin Schmidt, Bay City, Mich., assignor to Cooper Industries, Inc., Houston, Tex., a corporation of Ohio
Filed Jan. 22, 1968, Ser. No. 699,495
Int. Cl. B65h 75/16
U.S. Cl. 242—84.8                                    8 Claims

---

ABSTRACT OF THE DISCLOSURE

A tape measure construction comprising a tape casing formed of a pair of mating sections having aligned slots forming a tapeline opening therein near a bottom wall thereof; a motor retracted tapeline coiled in the casing and having a free end with a tape hook thereon extending out the opening; and wherein aligned slots in the bottom wall portions are provided adjacent the tape opening to define with the tape opening slots resilient bumper leaf springs disposed in the path of the tape hook to engage and cushion it when the motor means is retracting the tapeline at high speed.

---

The present application is owned by the assignee of copending application Ser. No. 654,468 filed July 19, 1967 relating to a tape measure construction incorporating a tape hook bumper. As pointed out in that application the stress wound return springs utilized in contemporary automatic return tape measures have considerable torque and one of the problems which has been encountered in the measuring tape industry is the gradual destruction of the tape hook on the tapeline by the constant hammering it receives as the line is retracted into the casing. Quite often users will simply hold the retract button in depressed position until the entire tape is returned to the casing at full speed with the result that the tape hook slams into the casing under the force of the full torque produced by the return spring. The hook under this impact will quite often bend; however, more importantly the shear load applied to the hook rivet will tend to tear the rivet loose. Further when a sudden stress is applied in tape rules at the rivet holes there is also a tendency for the tapeline to split in the rivet area.

One of the primary objects of the present invention is to provide a tape measure having a casing molded in a suitable plastic or like resilient material which is constructed in such a manner as to form resilient bumper members disposed so as to absorb a large percentage of the impact load and cushion the shock of the returning hook so that the tape measure is not destroyed in a relatively short time even by careless users.

A further object of the invention is to provide a tape measure of the character described which can be economically formed in the manner indicated and is of highly reliable and durable construction.

Other objects and advantages of the invention will be pointed out specifically or will become apparent from the following description when it is considered in conjunction with the appended claims and the accompanying drawings, in which:

Figure 1:
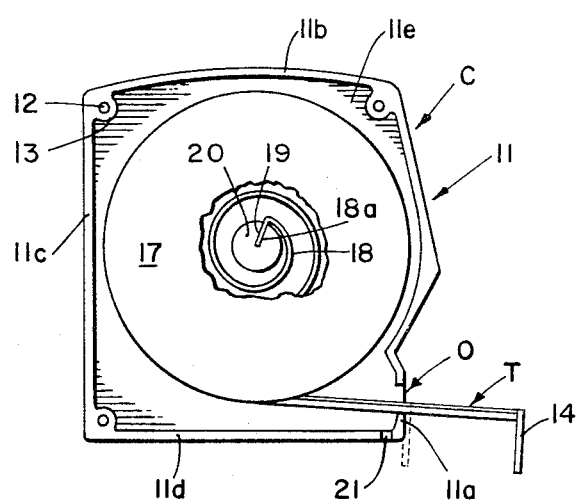
FIG. 1 is a side elevational view of a tape measure with one of the side sections removed to expose the interior thereof.

Referring now more particularly to the accompanying drawings, wherein I have shown a preferred embodiment of the invention only, the numerals 10 and 11 generally indicate preferably plastic tape casing side sections which respectively include front walls 10a and 11a; top walls 10b and 11b; rear walls 10c and 11c; bottom walls 10d and 11d and side walls 10e and 11e. Threaded openings 12 may be provided in eye members 13 provided on the casing section 11 and screws (not shown) may be utilized in the usual manner to extend from openings in the casing section 10 into the openings 12 to secure the casing sections 10 and 11 in mated relation.

Figure 2:
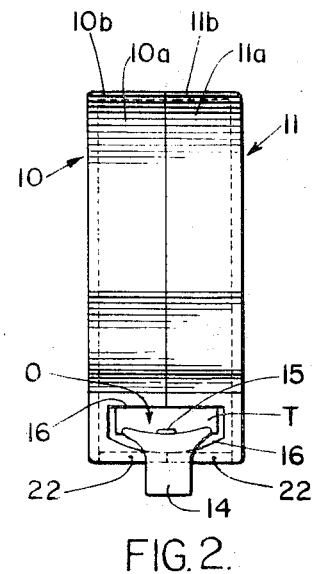
FIG. 2 is a front elevational view thereof.
Figure 4:
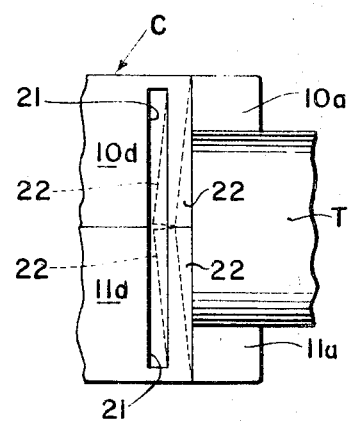
FIG. 4 is a considerably enlarged fragmentary bottom view with the chain lines illustrating a deflected position of the bumper leaves formed.

A tapeline generally designated T and having a tape hook 14 riveted thereto in the usual manner as at 15 may be withdrawn from the tape casing generally designated C through a tape opening O formed by aligned slots 16 provided in each casing section front wall 10a and 11a. The tapeline T is wound on the tape drum 17 which is powered by the usual return spring 18, the spring 18 having its end 18a anchored in a slot 19 provided in a center post 20 projecting centrally from the casing section 11. It will be observed that the tape hook 14 is less in width than the frontal tape opening O formed by the aligned slots 16 provided in the casing section front walls 10a and 11a and it will also be observed that it is less in width than the aligned slots 21 (see FIG. 2) formed in the bottom wall sections 10d and 11d adjacent the casing front walls 10a and 11a. The slots 21 cooperate with the slots 16 to define leaf spring type bumper fingers or cushioning members 22 which are deflectable under load to the chain line positions in which they are shown in FIG. 4.

Figure 3:
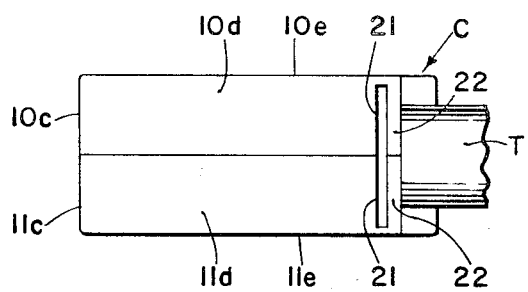
FIG. 3 is a bottom view.

In operation when the tape line has been extended from the casing C and the spring return button is pressed to withdraw it into the casing C through the opening 16, tape hook 14 slams into the deflectable fingers 22 which absorb the impact of the returning tapeline T and do not transmit the shock to the extent there is any tendency to inadvertently drop the tape measure. The deflectable leaf members 22 are sufficiently resilient to cushion the tape hook and return to the normal solid line position in which they are shown in FIGS. 3 and 4 after absorbing the shock impact mentioned.

As mentioned the tape casing is preferably molded of a plastic material. Suitable plastic materials are Delrin, nylon, polyethylene, polyurethane, polyvinyl acetate and polypropylene.

I claim:

1. In a measuring tape construction: casing means having a front wall with a tape opening therein; a tapeline coiled in said casing means and having a leading end extending out said opening; a retaining tape hook on said end extending angularly to said tapeline and operative to prevent said end from being drawn fully into said casing means; motor means within said casing means, operable for withdrawing said tapeline into said casing means except for said tape hook; and exposed resilient, deflectable bumper means formed in said front wall and mounted in opposed relation with said hook in superposed relation with the tape opening to prevent said hook from slamming against said casing means when the motor means is operating to retract said tapeline into said tape opening.

2. The combination defined in claim 1 in which said bumper means is generally parallel to said tape opening and of somewhat greater width than said tape hook.

3. The combination defined in claim 1 in which slot means is provided in said casing means in generally superposed relation with said tape opening to define a tape hook engaging member; one end of said member being free so that said member is deflectable inwardly to cushion said tape hook.

4. In a measuring tape construction: casing means having a frontal tape opening therein; a tapeline coiled in said casing means and having a leading end extending out said opening; a retaining tape on said end extending angularly to said tapeline and operative to prevent said end from being drawn fully into said casing means; motor means within said casing means, operable for withdrawing said tapeline into said casing means except for said tape hook; and resilient bumper means comprising exposed, opposed, deflectable leaf spring members, secured adjacent each end of said tape opening in superposed relation therewith and projecting inwardly, mounted in opposed relation with said hook to prevent said hook from slamming against said casing means when the motor means is operating to retract said tapeline into said tape opening.

5. In a measuring tape construction: a casing formed of resilient material comprising mating side sections with abutting bottom and front wall portions and having a frontal tape opening adjacent said bottom wall portion formed by horizontally aligned slots in said front wall portions; a tapeline coiled in said casing and having a leading end extending out said opening; tape hook means on said end extending angularly to the tapeline to prevent said end from being drawn fully into said casing means; motor means within said casing means operable for withdrawing said tapeline into said casing means except for said tape hook means; said csasing having communicating slots in the abutting edges of said bottom wall portions adjacent and generally paralleling said tape opening to form exposed, deflectable bumper leaf springs between said slots and tape opening disposed in the path of said tape hook to engage and cushion said hook when the motor means is operating to sharply retract said tapeline.

6. The combination defined in claim 5 in which said slot means in the bottom wall portions is generally parallel to said tape opening.

7. The combination defined in claim 6 in which said casing side sections comprise shells with mating front, rear, lower, and upper edge wall portions joined to side wall portions; said slot means in the lower wall portions comprising communicating slots formed in the lower wall portion of each shell and opening to the mating edges of said lower wall portions.

8. The combination defined in claim 7 in which said slots are together longer than the tape hook is wide.

References Cited
UNITED STATES PATENTS

| | | | |
|---|---|---|---|
| 650,712 | 5/1900 | Eddy | 242—84.8 |
| 706,697 | 8/1902 | Sims | 242—107.2 |
| 2,132,202 | 10/1938 | Carlson | 242—84.8 |

NATHAN L. MINTZ, Primary Examiner